United States Patent [19]
Held

[11] Patent Number: 4,599,940
[45] Date of Patent: Jul. 15, 1986

[54] CONTINUOUSLY OPERATING PRESS FOR PRESSING AN ADVANCING WEB OF MATERIAL

[76] Inventor: Kurt Held, Alte Strasse 1, 7218 Trossingen 2, Fed. Rep. of Germany

[21] Appl. No.: 648,835

[22] Filed: Sep. 10, 1984

[30] Foreign Application Priority Data
Sep. 24, 1983 [DE] Fed. Rep. of Germany ....... 3334584

[51] Int. Cl.$^4$ ................................................ B30B 9/24
[52] U.S. Cl. .................................. 100/154; 156/583.5; 198/500; 184/15.3; 474/91
[58] Field of Search ................ 100/151, 152, 153, 154, 100/118, 119, 120; 425/101, 100, 371; 156/583.5, 555; 198/500; 474/91, 92; 184/15.1, 15.2, 15.3

[56] References Cited
U.S. PATENT DOCUMENTS

| | | | |
|---|---|---|---|
| 2,981,307 | 4/1961 | Malarkey, Jr. ...................... | 100/154 |
| 3,521,552 | 7/1970 | Knapp .............................. | 100/154 X |
| 3,613,564 | 10/1971 | Adamski et al. ................... | 100/152 |
| 3,680,476 | 8/1972 | Pfeiffer .............................. | 100/151 |
| 3,981,666 | 9/1976 | Wadman .......................... | 198/500 X |
| 4,419,062 | 12/1983 | de Mets .............................. | 425/101 |

FOREIGN PATENT DOCUMENTS

| | | |
|---|---|---|
| 1939784 | 3/1971 | Fed. Rep. of Germany . |
| 2400762 | 7/1978 | Fed. Rep. of Germany . |
| 2735142 | 2/1979 | Fed. Rep. of Germany . |
| 3148412 | 6/1983 | Fed. Rep. of Germany . |
| 132059 | 12/1980 | German Democratic Rep. . |

Primary Examiner—Peter Feldman
Attorney, Agent, or Firm—Shenier & O'Connor

[57] ABSTRACT

The invention relates to a continuously operating press for pressing an advancing web of material, with an upper and a lower endless press band, each guided over a pair of deflection rollers and comprised of several interlocking band layers, and with a press zone for the web of material located between the lower strand of the upper and the upper strand of the lower press band. In order to prevent destruction of the surfaces of the band layers and mutual "seizure", provision is made for the band layers forming a press band to be lubricated on their mutually contiguous surfaces.

20 Claims, 6 Drawing Figures

CONTINUOUSLY OPERATING PRESS FOR PRESSING AN ADVANCING WEB OF MATERIAL

The invention relates to a continuously operating press for pressing an advancing web of material, with an upper and a lower endless press band, each guided over a pair of deflection rollers and comprised of several interlocking band layers, and with a press zone for the web of material located between the lower strand of the upper and the upper strand of the lower press band.

In presses of this kind (German Offenlegungsschrift No. 19 39 784), the individual band layers of the press band in the form of a "multi-layered band package" have different relative speeds in operation, and the band layers rub against one another. This may result in an undesired destruction on account of cold welding or "seizure" of the band surfaces.

The object underlying the invention is to reduce to a minimum the frictional forces between the band layers of a press band which are in the form of a multi-layered band package.

The object is attained in accordance with the invention in that the band layers forming a press band are lubricated on their mutually contiguous surfaces.

The invention will now be explained in further detail, by way of preferred embodiments, with reference to the attached drawings.

Figure 1:
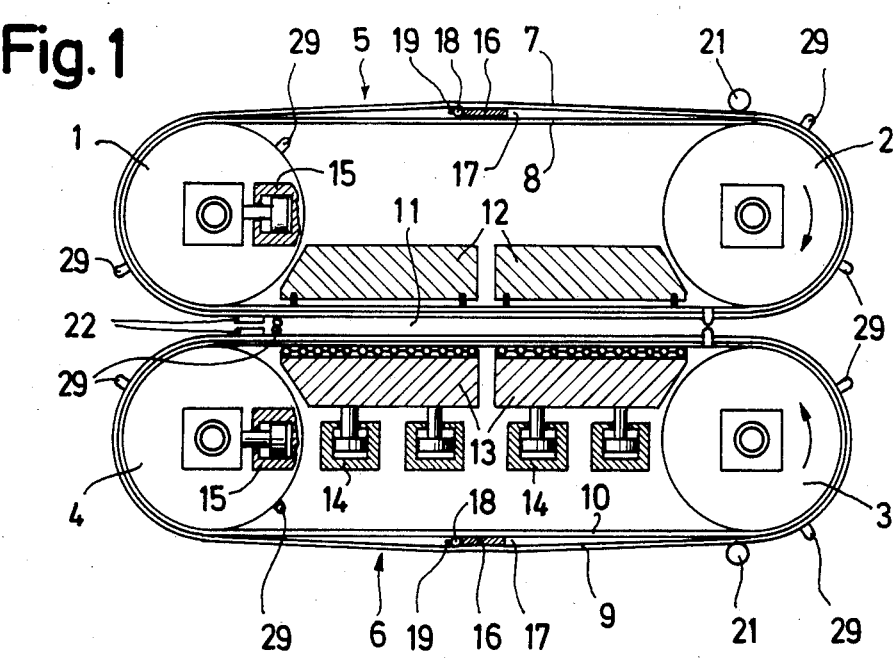
FIG. 1 is a schematic sectional view of a continuously operating press with press bands comprised of several layers.

In the continuously operating press, illustrated schematically in FIG. 1, for pressing an advancing web of material, four deflection rollers 1, 2, 3, 4 are rotatably mounted on a press frame which is not illustrated. An endless upper press band 5 extends around the rollers 1, 2 forming a first pair, and a lower press band 6 around the rollers 3, 4 forming a further pair. Both press bands 5, 6 consist of two interlocking band layers 7, 8 and 9, 10, respectively. The direction of rotation is indicated by the arrows in the deflection rollers 2, 3. Located between the lower strand of the upper press band 5 and the upper strand of the lower press band 6 is the reaction or press zone 11 in which a web of material advancing from right to left in FIG. 1, preferably with the simultaneous application of heat, can be compacted. Laminates impregnated with synthetic resin, particle board, fibreboard, plywood, electrolaminates and the like are particularly well suited as materials. In order to apply the heat which may be required, one roller 2, 3 of each roller pair may be heated. Originating from pressure plates 12, 13, the pressure to be exerted on the web of material is hydraulically or mechanically transmitted onto the band strands delimiting the press zone 11 at the top and bottom. In the event of hydraulic pressure transmission, the pressure plates 12 are mounted stationarily on the frame. A pressure medium which may be subjected to pressure is inserted into the space between pressure plate 12 and rear side of the associated band strand. In the case of mechanical pressure transmission, rollers extending transversely throughout the width of the band are arranged in the space between the slideably mounted pressure plates 13 and the associated band strand. The pressure plates 13 with the rollers are pressed against the band strand via pressure medium cylinders 14 mounted on the press frame. Finally, both press bands 5, 6 may be tensioned in a known manner via tensioning means 15, for example, hydraulic cylinders, mounted stationarily on the frame. The press bands consist of metal, in particular, steel. The radius of curvature occurring as the press bands 5, 6 turn at the deflection rollers 1, 2, 3, 4 is of different dimensions in the case of the individual band layers 7, 8 and 9, 10 of the bands. The individual band layers, therefore, move at different speeds, which results in a relative displacement between the individual band layers. Due to this relative displacement, sliding friction occurs at the contiguous surfaces of the band layers, which may cause the superimposed surfaces of the individual band layers to be destroyed. To prevent this, provision is made, in accordance with the invention, for the band layers forming a press band to be lubricated on their mutually contiguous surfaces.

In the embodiment of the invention shown in the drawings, the lubrication is effected using lubricants in liquid or powder form inserted between the band layers of the press bands. To this end, there is inserted between two band layers 7, 8 and 9, 10, respectively, a spacer 16—see FIGS. 1 and 2—at the respective strand of the press band 5 and 6, respectively, remote from the press zone 11. The spacer 16 which may, for example, be in the form of a wedge or a plate, expands the otherwise surface-to-surface superimposed band layers so that a space 17 is created between these layers. The spacer extends over the entire width of the press band so that the space 17 also extends over the entire width of the band. Arranged in the space 17 is a lubricant supply device 18 for the introduction of lubricant in powder or liquid form, for example, a lubricating oil. The supply device 18, which preferably likewise extends throughout the entire width of the press band is in the form of a tube comprising mutually spaced outlet openings, for example, in the form of nozzles 19, for the lubricant. The lubricant introduced into the tube under pressure exits from the nozzles and is distributed in the space 17 over the band layer surfaces facing each other. Suitable selection of the mutual spacing between the outlet openings enables the entire surfaces to be uniformly covered with lubricant. Finally, the rotational motion of the press bands 5, 6 causes the lubricant to be carried along, with the result that all in all the surfaces of the band layers forming the press band which are mutually contiguous again after leaving the space 17 are covered with lubricant.

Figure 2:
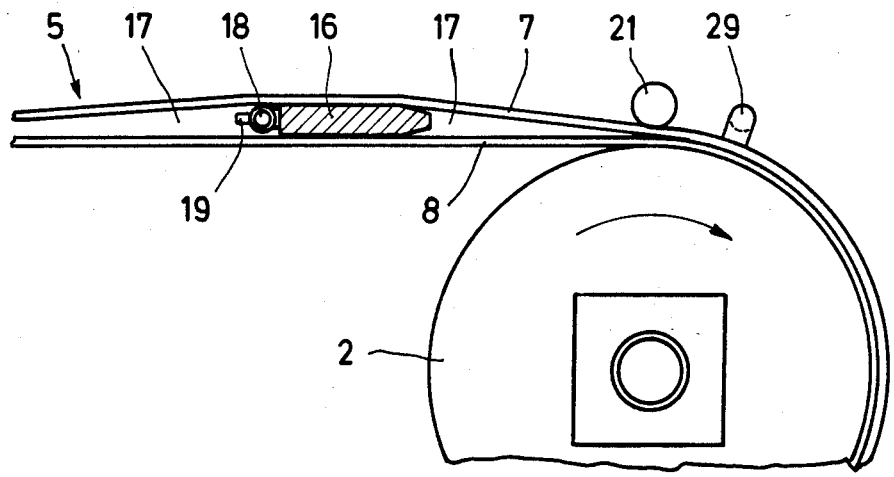
FIG. 2 is an enlarged, partial sectional view of the press shown in FIG. 1.

It is irrelevant as to whether the lubricant supply device 18 is arranged in front of or behind the spacer 16 with reference to the direction of advance of the press band. In FIGS. 1 and 2, it is located in front of this spacer. In a preferred embodiment of the invention, provision is made for spacer 18 and lubricant supply device 19 to be in the form of an integral member, by, for example, a cavity connectable to a lubricant pump and having outlet openings being provided in the spacer itself.

If a press band 5, 6 consists of more than two band layers 7, 8 and 9, 10, respectively, a spacer 16 with a lubricant supply device 18 is provided between each of two band layers, so that all of the band layer surfaces moving against each other are lubricated.

Excess lubricant, in particular, liquid lubricating oil which might run out at the edges of the press bands 5, 6 and soil the web of material in the press zone 11 is previously removed. This is effected by press rolls 21, 22 arranged in the area of the deflection rollers 1, 2, 3, 4 so as to press the band edges against the cylindrical surface area of these rollers. These press rolls are preferably arranged at the point of transition of the substantially straight-lined path of the press bands to the curved path at the deflection rollers. The press rolls engage the edge of the outwardly located band layer of a double-layered press band.

Figure 3:
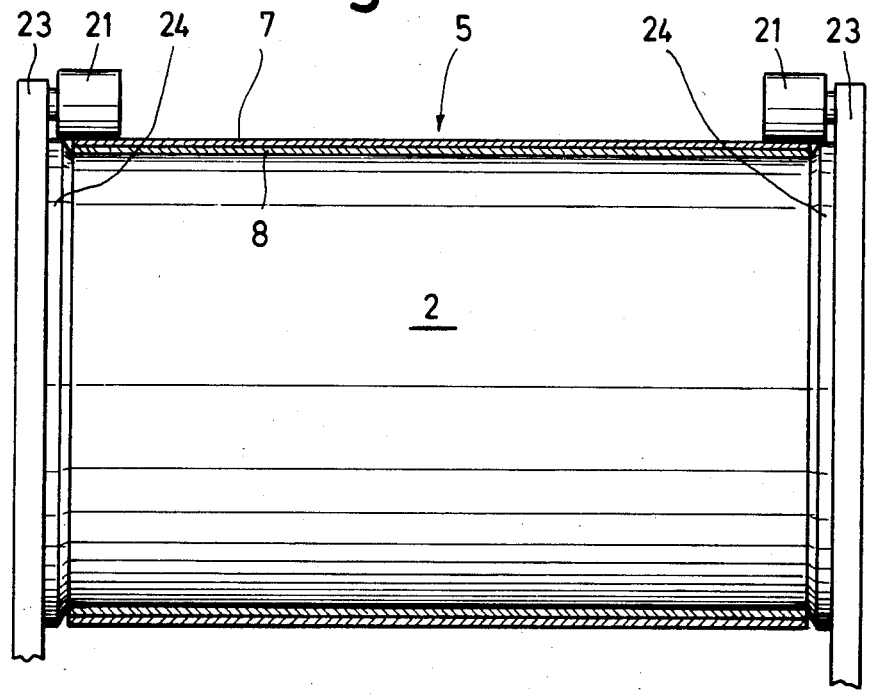
FIG. 3 is a view of a deflection roller of the press band.

As illustrated in FIG. 3, the press rolls 21 in the form of cylindrical rolls mounted for rotation in holding means 23 stationarily arranged on the frame protrude, on the one hand, beyond the edges of the press band 5 and, on the other hand, beyond rim discs 24 provided at the end faces of the deflection roller 2. The rim discs 24 serve to guide the band layers 7, 8 of the press band 5 and prevent undesired lateral displacement of the band layers relative to one another and to the deflection roller. The press rolls 21 press against the press band edges, whereby the lubricant which has collected at the edges of the individual band layers 7, 8 is pressed out and runs off laterally. From there it is removed in a manner which will be described subsequently, so that it cannot have an adverse effect within the reaction zone 11.

In another embodiment of the invention, the cylindrical press rolls 21 shown in FIG. 3 may also be of truncated cone configuration with the conical peaks pointing towards the centre of the press band, which makes for better adaptation to the dynamic path of the press band edge in the area of press roll 21 and deflection roller.

Figure 4:
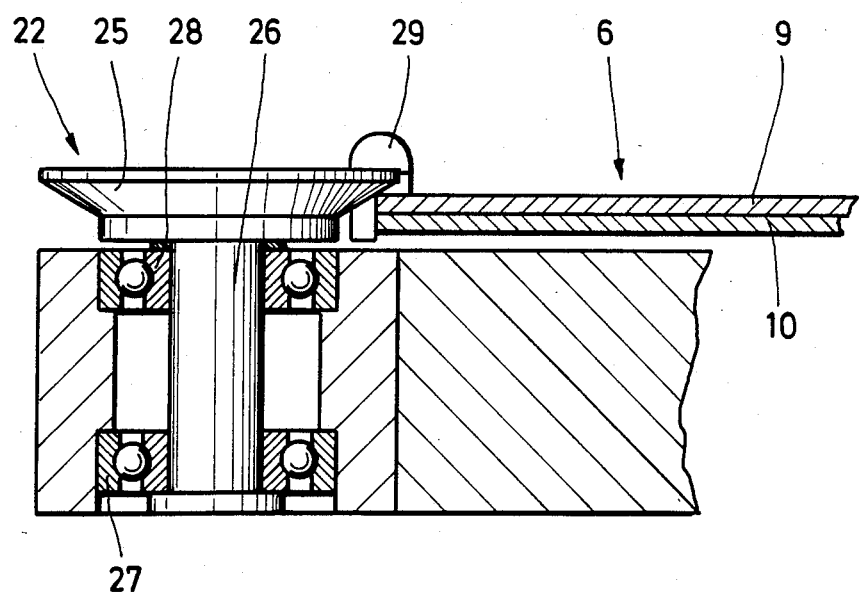
FIG. 4 is a sectional view of a disc-shaped press roll.

Due to lack of space, a cylindrical press roll 21 as shown in FIG. 3 cannot be arranged in the area of the press zone 11. A flat disc 25 of conical configuration which is rotatably mounted with an axis 26 in roller bearings 27, 28 and presses with its conically bevelled side surfaces onto the edge of the double-layered press band 6 is used there as press roll 22—see FIGS. 1 and 4. In another embodiment of the invention, the press roll 22 might also be in the form of a disc pressing with one of its faces onto the edge of the press band. In any case, the overlapping between press roll and press band is so slight that this does not interfere with the web of material advancing together with the press band.

The press rolls 21 or 22 simultaneously also serve to prevent mutual deviation of the band layers of the press bands relative to one another by holding the individual band layers down in such a way that they move within the guides formed by the rim discs 24.

Figure 5:
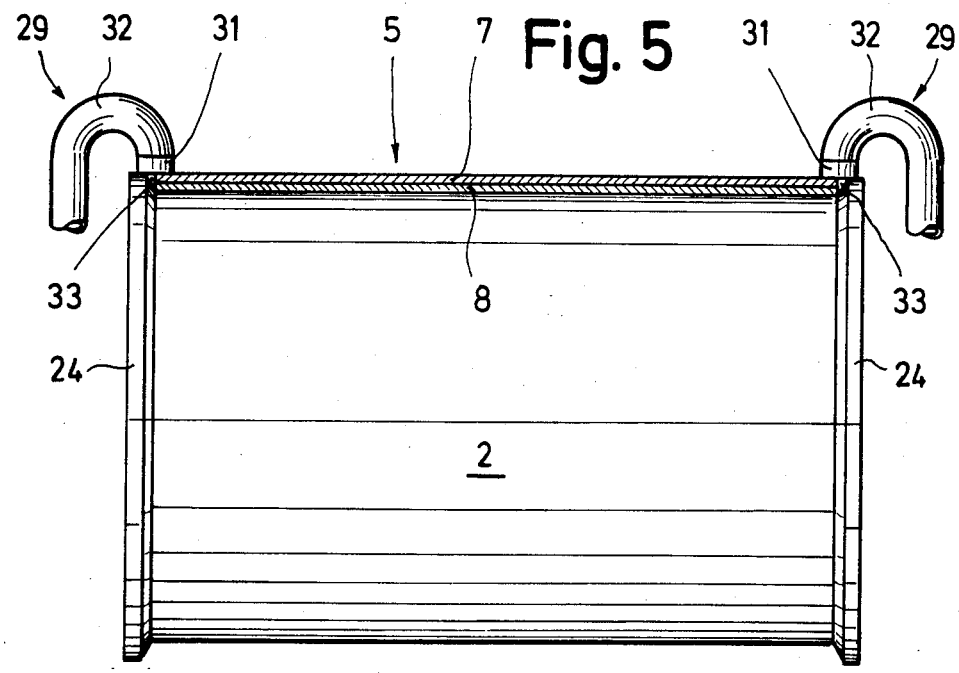
FIG. 5 shows a suction device for emerging lubricant.

Emerging lubricant is removed with the aid of receiving means 29 arranged in the manner shown in FIG. 1. The receiving means 29 are preferably arranged in the proximity of the press rolls 21, 22 for absorption of the lubricant pressed out by these rolls. As is apparent from FIG. 5, the receiving means 29 are in the form of suction nozzles 31 connected via leads 32 to suction pumps which are not illustrated. When the press is in operation, the edges of the press bands 5, 6 glide past the suction nozzles 31 so that excess lubricant is drawn off by suction. As is evident from FIG. 5, the suction nozzles 31 also partly overlap the rim discs 24. The lubricant entering the cavity 33 between the bevelled edge of the rim disc 24 and the edge of the multi-layered press band 5 can, therefore, be absorbed and removed.

As is apparent from FIG. 1, further receiving means 29 may, if required, be arranged at various places on the deflection rollers or on the press bands. If necessary, the receiving means 29 may also extend over the entire width of the deflection rollers and the press bands in the event that lubricant should spread over the entire width of the press bands.

Figure 6:
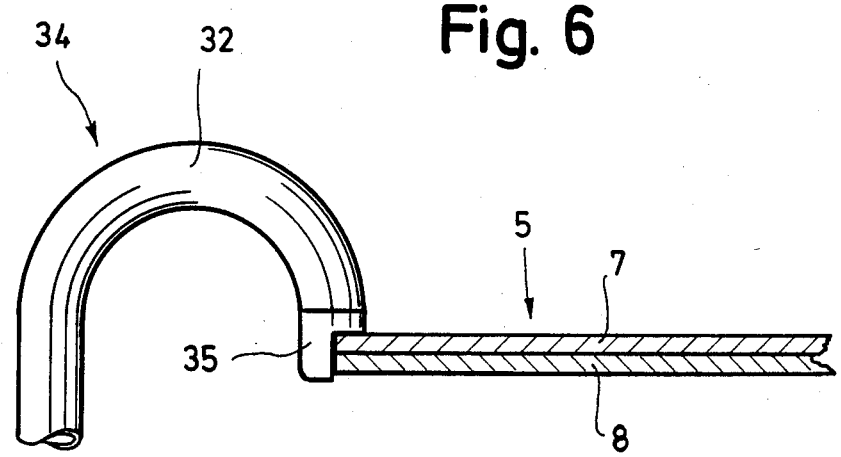
FIG. 6 shows a modified suction device.

FIG. 6 shows a receiving means 34 whose suction nozzle 35 completely overlaps the edge of the press band 5 and its side surfaces. Such an embodiment is suitable for receiving means which are not to be arranged at places on the press where the side surfaces of the press band are covered by the rim discs 24 of the deflection rollers.

Lubricant which has been drawn-off by suction is, furthermore, passed through a filter, with residues being removed, if necessary, and it is then reintroduced between the layers of the press bands via the lubricant supply devices 18.

In another embodiment of the invention, the individual press band layers are lubricated by a metal coating which is of self-lubricating design and therefore exhibits good "resistance to seizure" properties. In this case, the press bands 5, 6, which, as a rule, likewise consist of metal, for example, steel, are provided with an appropriate metal coating. Dispersion coatings of nickel, chromium or the like are particularly suitable for this, in which case, a disperse phase is present in the form of finely distributed particles in a metal matrix. While the particles are fixed by the matrix as embedding material, these particles act so as to inhibit wear and tear or as dry lubricants. The particles preferably consist of graphite, molybdenum disulfide, teflon or the like, or, if the particles are hard, of silicon carbide, iron boride or the like. The metal matrix may be applied chemically by redox reactions, galvanically or also by flame or plasma spraying. A further possibility of producing wear-resistant surfaces of contiguous band layers of a press band consists in diffusing under vacuum and in gaseous form carbides, nitrides, oxides, borides with a "resistance to seizure" tendency, for example, TiC, TiN, CrC or the like, into the band layer surface.

In yet again another embodiment of the invention, the mutual lubrication of the band layers forming a press band is effected by providing these layers with plastic coatings, which, in turn, can rub against one another with good resistance to seizure properties. Coatings consisting of teflon, polyimides with graphite filling, polyacetal and so-called self-lubricating bearing materials are particularly suitable for this. The latter are compounds based on a halogenated, solid hydrocarbon which, in turn, is enriched with homogeneously distributed fillers tuned to certain cases of use.

The dry lubricants or self-lubricating agents deposited in the respective coating of the individual band layers of a press band reduce the sliding friction coefficient between the band layers, thereby decreasing the frictional force and the consequently occurring frictional heat. A cold welding or "seizure" which may occur in the event of local overheating due to frictional heat of two superimposed band layer surfaces is, therefore, effectively prevented.

The prevention of cold welding of two press band layers under all feasible operating conditions is ensured to a particularly high degree, in accordance with the invention, if the lubrication by means of a lubricant such as lubricating oil, is combined with a metal or plastic coating of the aforementioned type applied to the press band layers. In this case, the lubricant (lubricating oil) forms a slide film with a particularly low sliding friction coefficient and ensures that occurring frictional heat is well dissipated. If, under particularly unfavourable operating conditions, for example, in the event of particularly high pressure, the lubricant is displaced in some areas, resulting in overheating of the press band in areas and in the danger of "seizure", the resistance to seizure properties of the surface coatings of metal or plastic become effective, thereby eliminating this danger. Even in the event of a total failure of the lubricant supply, the press can then still continue to operate without the risk of the expensive, multi-layered press bands being destroyed.

I claim:

1. A continuously operating press for pressing an advancing web of material including in combination a first pair of deflection rollers, an upper endless press band guided over said first pair of deflection rollers, a second pair of deflection rollers, a lower endless press band guided over said second pair of deflection rollers, said press bands forming a press zone for a web of material located between the lower strand of the upper press band and the upper strand of the lower press band, each of said upper and lower press bands comprised of several interlocking band layers having mutually contiguous surfaces, and means for lubricating said mutually contiguous surfaces of said interlocking band layers.

2. A press as in claim 1 in which said lubricating means comprises a self-lubricating metal layer coated on said mutually contiguous surfaces of said band layers.

3. A press as in claim 1 in which said lubricating means comprises a self-lubricating plastic layer coated on said mutually contiguous surfaces of said band layers.

4. Press according to claim 2, characterized in that the metal layer includes a metal matrix with particles embedded therein in a finely distributed manner.

5. Press according to claim 4, characterized in that the embedded particles are hard, wear-resistant particles, in particular, comprised of silicon carbide and/or iron boride.

6. Press according to claim 4, characterized in that the embedded particles are particles with dry lubricating properties, in particular, comprised of molybdenum disulfide, graphite and/or teflon.

7. Press according to claim 3, characterized in that the plastic layer consists of teflon, polyimides with graphite filling and/or polyacetal.

8. Press according to claim 1, characterized in that said lubricating means comprises a spacer (16) and also a lubricant supply device (18) are arranged between two respective band layers (7, 8 and 9, 10, respectively) at the strand of the press band (5, 6) remote from the press zone (11), in that press rolls (21, 22) are arranged at the edges of the press band in the area of a deflection roller (1, 2, 3, 4), and receiving means (29, 34) for removal of lubricant emerging from the band layers are arranged at least in the area of the press rolls.

9. Press according to claim 2, characterized in that said lubricating means comprises a spacer (16) and also a lubricant supply device (18) are arranged between two respective band layers (7, 8 and 9, 10, respectively) at the strand of the press band (5, 6) remote from the press zone (11), in that press rolls (21, 22) are arranged at the edges of the press band in the area of a deflection roller (1, 2, 3, 4), and receiving means (29, 34) for removal of lubricant emerging from the band layers are arranged at least in the area of the press rolls.

10. Press according to claim 3 characterized in that said lubricating means comprises a spacer (16) and also a lubricant supply device (18) are arranged between two respective band layers (7, 8 and 9,10, respectively) at the strand of the press band (5,6) remote from the press zone (11), in that press rolls (21, 22) are arranged at the edges of the press band in the area of a deflection roller (1, 2, 3, 4), and receiving means (29, 34) for removal of lubricant emerging from the band layers are arranged at least in the area of the press rolls.

11. Press according to claim 8, characterized in that the press rolls (21, 22) protrude beyond both the edge of the press band (5, 6) and a rim disc (24) provided at the deflection roller (1, 2, 3, 4).

12. Press according to claim 9, characterized in that the press rolls (21, 22) protrude beyond both the edge of the press band (5, 6) and a rim disc (24) provided at the deflection roller (1, 2, 3, 4).

13. Press according to claim 10, characterized in that the press rolls (21, 22) protrude beyond both the edge of the press band (5, 6) and a rim disc (24) provided at the deflection roller (1, 2, 3, 4).

14. Press according to claim 8, characterized in that the spacer (16) is wedge-shaped.

15. Press according to claim 9, characterized in that the spacer (16) is wedge-shaped.

16. Press according to claim 10, characterized in that the spacer (16) is wedge-shaped.

17. Press according to claim 8, characterized in that the lubricant supply device (18) includes a tube with outlet openings for the lubricant.

18. Press according to claim 8, characterized in that the spacer (16) and the lubricant supply device (18) are in the form of an integral member.

19. Press according to claim 8, characterized in that the press rolls (22) consist of a disc (25) with a conical edge.

20. Press accoring to claim 8 characterized in that the receiving means (29, 34) is in the form of a suction pipe (32) and glides with a suction opening (31, 35) along the press band edges as they pass by.

* * * * *